United States Patent
Kim (10) Patent No.: US 8,645,003 B2
(45) Date of Patent: Feb. 4, 2014

(54) BRAKING CONTROL SYSTEM AND METHOD FOR VEHICLE

(75) Inventor: Jong Sung Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 450 days.

(21) Appl. No.: 13/015,893

(22) Filed: Jan. 28, 2011

(65) Prior Publication Data

US 2011/0320099 A1 Dec. 29, 2011

(30) Foreign Application Priority Data

Jun. 28, 2010 (KR) .......................... 10-2010-0061325

(51) Int. Cl.
*G06F 17/00* (2006.01)

(52) U.S. Cl.
USPC ............... 701/1; 701/29.2; 701/30.6; 701/70; 701/71; 701/78; 303/116.1; 303/119.1; 303/119.2; 303/119.3; 303/121; 188/356; 188/358; 73/121; 180/197

(58) Field of Classification Search
USPC .......... 701/1, 29.2, 30.6, 70, 71, 78; 303/3, 7, 303/9.62, 9.66, 15, 20, 112, 113.2, 113.4, 303/114.1, 114.3, 116.1, 119, 119.1, 119.2, 303/119.3, 121, 123, 125, 155; 188/356, 188/358; 73/121; 180/197
See application file for complete search history.

(56) References Cited

U.S. PATENT DOCUMENTS

| | | | |
|---|---|---|---|
| 6,932,738 B2* | 8/2005 | Aoki et al. ...................... | 477/5 |
| 2008/0136252 A1* | 6/2008 | Ro ............................. | 303/113.4 |
| 2010/0007199 A1 | 1/2010 | Kim | |
| 2010/0030421 A1* | 2/2010 | Yoshimura et al. ............. | 701/29 |
| 2010/0147633 A1* | 6/2010 | Kim ............................. | 188/72.7 |
| 2010/0174430 A1* | 7/2010 | Irie ................................ | 701/22 |

FOREIGN PATENT DOCUMENTS

KR  20100007504 A  1/2010

* cited by examiner

*Primary Examiner* — McDieunel Marc
(74) *Attorney, Agent, or Firm* — Senniger Powers LLP (57) ABSTRACT

Provided are a braking control system for a vehicle which is controlled in a priority order, and a method of the same. A braking control system for a vehicle equipped with an electronic brake at each wheel includes a first control unit controlling the operation of a first electronic brake mounted at a front-left wheel and a second electronic brake mounted at a front-right wheel in response to braking signals, and a second control unit controlling the operation of a third electronic brake mounted at a rear-left wheel and a fourth electronic brake mounted at a rear-right wheel in response to the braking signals. In this configuration, when a fail occurs in any one of the first and second control units, the other control unit selectively controls at least one or more of the first to fourth electronic brakes, in accordance with predetermined logic.

16 Claims, 9 Drawing Sheets

BRAKING CONTROL SYSTEM AND METHOD FOR VEHICLE

BACKGROUND OF THE INVENTION

1. Field of the Invention

The present invention relates to a brake system of a brake-by-wire type vehicle, and more particularly, to technology of adaptively braking a vehicle in response to fails in a control unit or fails in electronic brakes respectively installed at the wheels, in a brake system that includes the electronic brakes installed at the wheels and achieves braking by an electronic control unit.

Further, the present invention relates to a technology of preparing for fails in the brake system of brake-by-wire type vehicles, that is, a fail-safe technology of a brake system.

2. Description of the Related Art

In general, the brake-by-wire is a kind of new technology used for vehicles in recent years, which has been developed to remove several parts and simplify assembly by using electronic control called 'by-wire'. That is, it is a concept used for controlling braking force by using electronic signals, replacing hydraulic brakes of the related art, in which the brake pedal unit and the brake actuator, such as the wheel cylinder, are separated.

The brake-by-wire brake system is composed of an operation pedal unit, a brake controller, and a brake actuator. The operation pedal unit is similar to the pedal units of the hydraulic brakes of the related art; however, electronic signals are generated from a common pedal stroke sensor, instead of signals that are generated by hydraulic pressure from a master cylinder and a booster. The brake controller is an electronic control circuit, which receives signals from the operation pedal unit and outputs operation signals by calculating appropriate brake pressure from pedal-pressing force and a stroke etc. The brake actuator is a wheel cylinder, a caliper of a disc brake, or an electronic motor, and applies braking force to the wheels of a vehicle in response to the operation signals from the brake controller.

The brake-by-wire brake system (hereafter, referred to as an electronic brake) and a hydraulic brake system of the related art are briefly compared hereafter.

A hydraulic brake system strongly pushes a pad to a disc in braking, using hydraulic pressure and has a configuration including not only the hydraulic line connected to a master cylinder operated to generate hydraulic pressure by a booster increasing pedal operation force and a wheel cylinder, but various devices controlling and complimenting the cylinders, such that the configuration is correspondingly complicated. Accordingly, there are some limits in ensuring safety and reliability of braking performance using hydraulic pressure, due to the complicated configuration.

On the other hand, an electronic brake system has a simple configuration, which the hydraulic brake system does not have, and can improve reliability of braking performance and implement a parking brake function. Further, it can improve response and performance of an ABS (Anti Brake System) and implement optimal global chassis control. In particular, a study has been conducted in recent years, which uses an EWB (Electro Wedge Brake) system that implements braking by pressing a brake pad against a disc to generate friction in braking, using a wedge assembly operated by an actuator, in order to compensate small braking force of common EMBs (Electro Mechanical Brake). The EWB can achieve braking force, which the hydraulic brake system can generate, with only a motor using 12 (Volt) voltage, because the EWB implements self-energizing using wedge action. In other words, large braking force can be achieved, even if force from the motor is small, by using a wedge structure in which as a wedge is moved by operating the actuator, the pad is pressed and friction force between the pad and the disc acts as additional input force.

Further, the EWB has the advantage of automatically compensating wear of the pad when the pad is worn, that is, providing a function of adjusting a gap due to the worn pad by moving the wedge assembly to the pad.

However, in spite of many advantages, the electronic brake system is pointed out that a vehicle with wheels equipped with the electronic brakes has considerably lower safety than a vehicle equipped with the hydraulic brakes. This depends on whether the electronic brake system can brake the vehicle under unexpected situations, such as a fail or an error in the operation of the control unit, because the electronic brake system has a basic structure that calculates braking force by using the ECU (Electronic Control Unit) and supplies power to the signal line and the driving motor that drives the actuator.

Accordingly, methods for dealing with fails of an electronic brake used as a braking device of a vehicle have been proposed. This is described with reference to FIG. 1.

Figure 1:
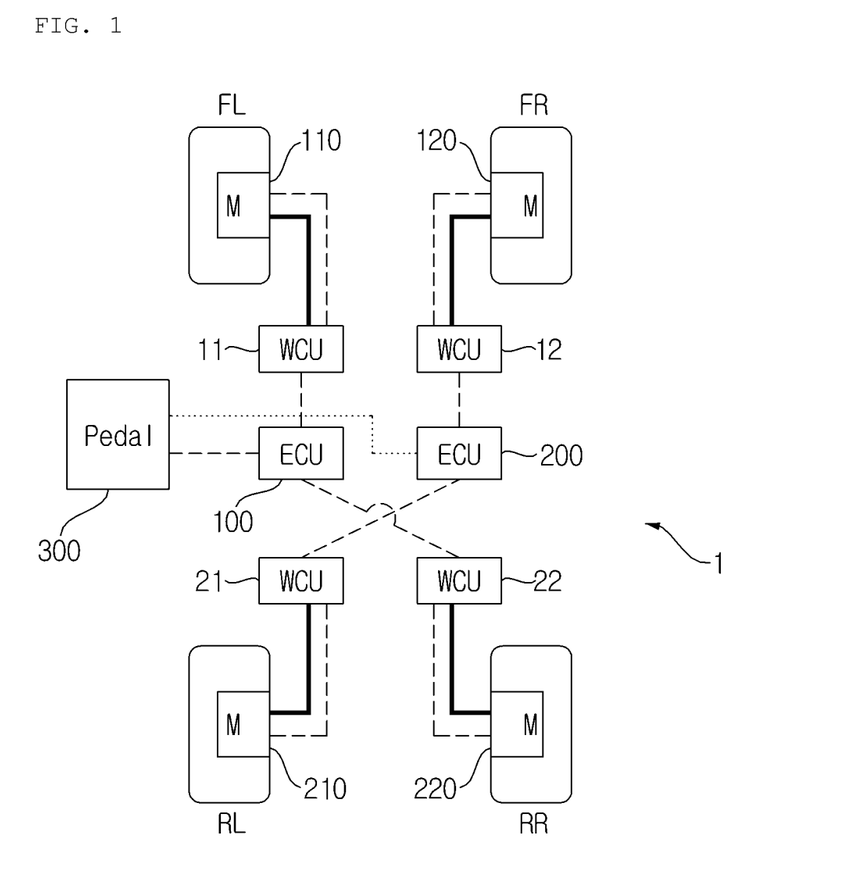
FIG. 1 is a diagram illustrating a brake system of the related art.

FIG. 1 is a diagram illustrating a brake system of the related art.

As shown in FIG. 1, a brake system 1 of the related art includes a pedal unit 300, electronic brakes 110, 120, 210, and 220 mounted at the wheels, respectively, WCUs (Wheel Control Unit) 11, 12, 21, and 22 controlling the electronic brakes, a first ECU 100, and a second ECU 200.

The brake system 1 of the related art receives brake signals (usually electronic signals) transmitted from the pedal unit 300, using the first and second ECU 100 and 200, respectively, at the center portion of the vehicle. The reason that the first and second ECUs 100 and 200 are doubly equipped is for implementing emergency braking with the other ECU, when a fail occurs in any one of the two ECUs. Meanwhile, the first ECU 100 transmits control signals to the WCUs 11 and 22 controlling the first electronic brake 110 and the fourth electronic brake 220 respectively, in which a signal connection line is formed in so called X-split structure to increase safety in emergency braking.

In the brake system of the related art, however, for example, when a fail simultaneously occurs in the WCU 11 controlling the first electronic brake 110 and the second control unit 200, braking is consequently performed only by the fourth electronic brake 220 at the rear wheel, which causes the driver to be exposed to significant danger.

As a result, since the brake system of the related art is equipped with two central control units (ECU) and four WCUs, it has a problem that the manufacturing cost increases. Further, there is another problem in that it is difficult to efficiently brake a vehicle, because the electronic brakes that the WCUs and the ECUs are in charge of, respectively, are fixed even in the brake system having the double structure.

SUMMARY OF THE INVENTION

The present invention has been made in an effort to provide a braking control system that selectively controls electronic brakes in consideration of a priority order of braking in preparation for a fail while controlling electronic brakes with two central control units, which replace a WCU equipped at each wheel.

The object, in detail, is achieved by a braking control system including: a first control unit controlling the operation of a first electronic brake mounted at a front-left wheel and a second electronic brake mounted at a front-right wheel in response to braking signals; and a second control unit controlling the operation of a third electronic brake mounted at a rear-left wheel and a fourth electronic brake mounted at a rear-right wheel in response to the braking signals, in which, when a fail occurs in any one of the first and second control units, the other control unit selectively controls at least one or more of the first to fourth electronic brakes.

However, the objects of the present invention are not limited to the object described above, and the other objects not stated in the above will be clearly understood by those skilled in the art from the following description.

An exemplary embodiment of the present invention provides a braking control system for a vehicle equipped with an electronic brake at each wheel, which includes: a first control unit controlling the operation of a first electronic brake and a second electronic brake in response to braking signals; and a second control unit controlling the operation of a third electronic brake and a fourth electronic brake in response to the braking signals, in which when a fail occurs in any one of the first and second control units, the other control unit selectively controls at least one or more of the first to fourth electronic brakes.

Further, available electronic brakes are selectively controlled in consideration of whether a fail occurs in the first to fourth electronic brakes, when a fail occurs in the first control unit, in which it is preferable that the available electronic brakes are selected in the following priority order.

[Priority Order]

1. Selectively control two electronic brakes at the front wheels.

2. Selectively control any one of the electronic brakes at the rear wheels which corresponds in the X-shape to any one of the electronic brakes at the front wheels.

3. Selectively control two electronic brakes at the rear wheels.

Further, the first control unit selectively controls available electronic brakes in consideration of whether a fail occurs in the first to fourth electronic brakes, when a fail occurs in the second control unit, in which it is preferable that the available electronic brakes are selected in the following priority order.

[Priority Order]

1. Selectively control two electronic brakes at the front wheels.

2. Selectively control any one of the electronic brakes at the rear wheels which corresponds in the X-shape to any one of the electronic brakes at the front wheels.

3. Selectively control two electronic brakes at the rear wheels.

In this configuration, it may be possible that the first and second control units detect where a fail occurs in each other, and receive signals representing whether a fail occurs in the first to fourth electronic brakes.

Further, it may be possible that power lines are connected between the first control unit and the first and second electronic brakes, between the second control unit and the third and fourth electronic brakes, and between the first control unit and the second control unit, in order that power is supplied to the first to fourth electronic brakes from the outside.

Further, it may be possible that the first and second control unit switch connection paths of the power lines to selectively supply the power to the first to fourth electronic brakes.

On the other hand, another exemplary embodiment of the present invention provides a braking control method of a vehicle equipped with an electronic brake at each wheel, which includes: receiving braking signals by using a first control unit controlling the operation of a first electronic brake and a second electronic brake in response to braking signals and a second control unit controlling the operation of a third electronic brake and a fourth electronic brake; and selectively controlling at least one or more of the first to fourth electronic brakes, when a fail occurs in any one of the first and second control units, by using the other control unit.

In this configuration, the second control unit selectively controls available electronic brakes in consideration of whether a fail occurs in the first to fourth electronic brakes, when a fail occurs in the first control unit, in which it is preferable that the available electronic brakes are selected in the following priority order.

[Priority Order]

1. Selectively control two electronic brakes at the front wheels.

2. Selectively control any one of the electronic brakes at the rear wheels which corresponds in the X-shape to any one of the electronic brakes at the front wheels.

3. Selectively control two electronic brakes at the rear wheels.

Further, the first control unit selectively controls available electronic brakes in consideration of whether a fail occurs in the first to fourth electronic brakes, when a fail occurs in the second control unit, in which it is preferable that the available electronic brakes are selected in the following priority order.

[Priority Order]

1. Selectively control two electronic brakes at the front wheels.

2. Selectively control any one of the electronic brakes at the rear wheels which corresponds in the X-shape to any one of the electronic brakes at the front wheels.

3. Selectively control two electronic brakes at the rear wheels.

Further, it may be possible that the first and second control units detect where a fail occurs in each other, and receive signals representing whether a fail occurs in the first to fourth electronic brakes.

Further, it may be possible that power lines are connected between the first control unit and the first and second electronic brakes, between the second control unit and the third and fourth electronic brakes, and between the first control unit and the second control unit, in order that power is supplied to the first to fourth electronic brakes from the outside.

Preferably, the first and second control unit may switch connection paths of the power lines to selectively supply the power to the first to fourth electronic brakes.

According to the exemplary embodiments of the present invention, which is disclosed in the specification, since the braking control system selectively controls electronic brakes in consideration of a priority order of braking in preparation for a fail while controlling electronic brakes with two central control units, which replace a WCU equipped at each wheel, it is possible to ensure high braking safety by performing emergency braking only with the electronic brakes at the front wheels or controlling electronic brakes arranged in an X-split type, in accordance with the positions and functions of failed control units and failed electronic brakes.

Further, it is possible to reduce the number of electronic control unit equipped with each wheel, such that it is possible to reduce the manufacturing cost and weight, and accordingly, which is economical.

DETAILED DESCRIPTION OF THE EMBODIMENTS

Hereinafter, exemplary embodiments of the present invention will be described in detail with reference to the accompanying drawings. When it is described that a component is connected to another component, herein, it means that the components are directly connected or a third component may be disposed between the components. First of all, it is to be noted that in giving reference numerals to elements of each drawing, like reference numerals refer to like elements even though like elements are shown in different drawings. The configuration and operation of the present invention shown in the drawings and described with reference to the drawings are provided as at least one embodiment, and the scope and the essential configuration and operation of the present invention are not limited thereto.

First, terminologies used herein are briefly described, before a braking control system for a vehicle and a braking control method according to an exemplary embodiment of the present invention are described.

The terminology 'electronic brake' used hereafter implies a brake relating to the brake-by-wire technology, which is implemented by various types of brake device different from hydraulic brakes of the related art. For example, it may imply an EMB (electro mechanical brake) and an EWB (Electronic wedge brake). Further, the following description is made under assumption that a vehicle is equipped with two front wheels and two rear wheels. The front wheels at the left and right are a front-left wheel and a front-right wheel, respectively, and the rear wheels at the left and right are a rear-left wheel and a rear-right wheel, respectively. Hereinafter, it should be noted that the front-left wheel, the front-right wheel, the rear-left wheel, and the rear-right wheel are referred to as FL, FR, RL, and RR, respectively, for the convenience of description.

Further, the first control unit and the second control unit imply ECUs (Electronic Control Unit). Further, although the first control unit and the second control unit are referred to as an F-ECU (Front ECU) and an R-ECU (Rear ECU) in the detailed description for consistency of description with the drawings, they represent the first control unit and the second control unit, and it should be noted that reference numeral 100* in the drawings implies the failed F-ECU.

Further, the electronic brakes 110, 120, 210, and 220 mounted at the wheels, respectively, are given with independent reference numerals, which are not changed in the following description for the convenience of description. That is, the first electronic brake, the second electronic brake, the third electronic brake, and the fourth electronic brake are indicated by independent reference numerals, 110, 120, 210, and 220, respectively.

Figure 2:
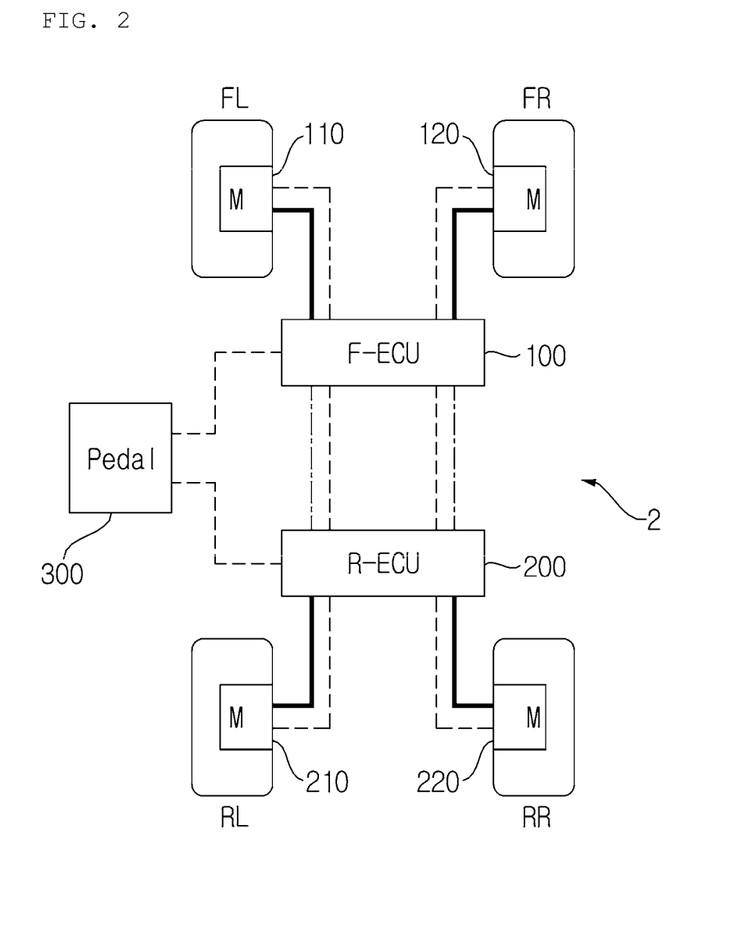
FIG. 2 is a diagram illustrating a braking control system for a vehicle which is controlled in the priority order according to an exemplary embodiment of the present invention.

FIG. 2 is a diagram illustrating a braking control system for a vehicle which is controlled in the priority order according to an exemplary embodiment of the present invention.

As shown in FIG. 2, a braking control system 2 according to the present invention includes electronic brakes 110, 120, 210, and 220 mounted at the wheels, respectively, an F-ECU 100, and an R-ECU 200.

First, the F-ECU 100 controls the operation of the first electronic brake 110 and the second electronic brake 120 of the front wheels in a normal mode. The R-ECU 200 controls the operation of the third electronic brake 210 and the fourth electronic brake 220 of the rear wheels.

The F-ECU 100 and the R-ECU 200 receive the driver's intention of braking, that is, braking signals generated from a pedal unit 300 by pedal-pressing force from the driver. The braking signals imply electronic signals generated from the pedal unit 300. The F-ECU 100 and the R-ECU 200 calculate braking force in response to the braking signals and control the operation of the corresponding electronic brakes.

Further, a power line is connected between the F-ECU 100 and the R-ECU 200, and power lines are also connected between the F-ECU 100 and the first electronic brake 110 and between the F-ECU 100 and the second electronic brake 120. Similarly, power lines are also connected between the R-ECU 200 and the third electronic brake 210 and between the R-ECU 200 and the fourth electronic brake 200. The power lines are transmissive paths of power supplied from a battery at the outside of the braking control system 2 to the electronic brakes 110, 120, 210, and 220 in order to operate the electronic brakes.

Further, the F-ECU 100 is connected with the electronic brakes 110, 120, 210, and 220 by signal lines to detect normal/abnormal operation, and the R-ECU 200 is also connected with the electronic brakes 110, 120, 210, and 220 by signal lines to detect normal/abnormal operation. Furthermore, a signal line is also connected between the F-ECU 100 and the R-ECU 200 to detect whether the counter-ECU fails.

In the positions of the F-ECU 100 and the R-ECU 200 in the braking control system 2 of a vehicle, it is preferable that the F-ECU 100 is positioned close to the electronic brakes 110 and 120 of the front wheel and the R-ECU 200 is positioned close to the electronic brakes 210 and 220 of the rear wheels. This is for minimizing a voltage drop depending on the length of the power lines by minimizing the distance between the ECUs 100 and 200 and the corresponding electronic brakes.

Next, the operation in an emergency mode (hereafter, including an abnormal mode) is described with reference to FIG. 3.

Figure 3:
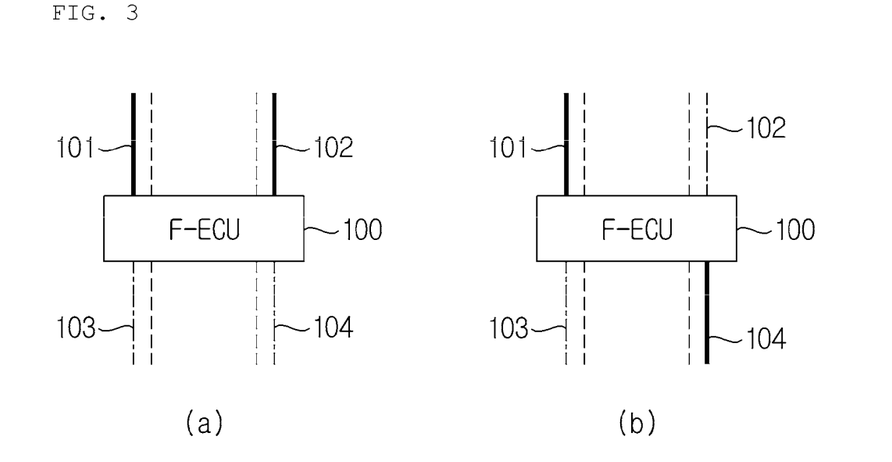
FIG. 3 is a diagram illustrating when power lines are switched in a first control unit of the present invention.

FIG. 3 is a diagram illustrating when power lines are switched in a first control unit of the present invention.

FIG. 3(a) shows connection between the F-ECU 100, power lines 101, 102, 103 and 104, and signal lines (shown by dotted lines) in the normal mode and FIG. 3(b) shows connection between the F-ECU 100, the power line 101, 102, 103, and 104, and the signal lines (shown by dotted lines) in the emergency mode, by way of example.

As shown in FIG. 3(a), the F-ECU 100 allows power to be supplied to the first electronic brake 110 and the second electronic brake 120 through the power line 101 and the power line 102, for braking in the normal mode.

However, as shown in FIG. 3(b), the F-ECU 100 allows power to be supplied to the first electronic brake 110 and the fourth electronic brake 220 through the power line 101 and the power line 104, for braking in the emergency mode. This is a so called X-split type control, which achieves stable braking by using the first electronic brake 110 and the fourth electronic brake 220, which are opposite to each other in X-shape.

As described above, the F-ECU 100 stops the power supplied to the power line 102 in the normal mode by switching the connection paths of the power lines such that the power line 101 and the power line 104 are connected therein, for braking in the emergency mode. Therefore, the power line 102 that has been the connection path of power in the normal mode stops the function, whereas the power is supplied to the fourth electronic brake 220 through the power line 104, which is a new power connection path, such that X-split control becomes possible.

Switching the power lines in the F-ECU 100 described with reference to FIG. 3 is provided as an example, and the R-ECU 200 can also perform this function, and particularly, switching the power lines depends on each case, which is described below.

The operation of the braking control system in the emergency mode is described hereafter with reference to the following exemplary embodiments.

First Exemplary Embodiment

Figure 4:
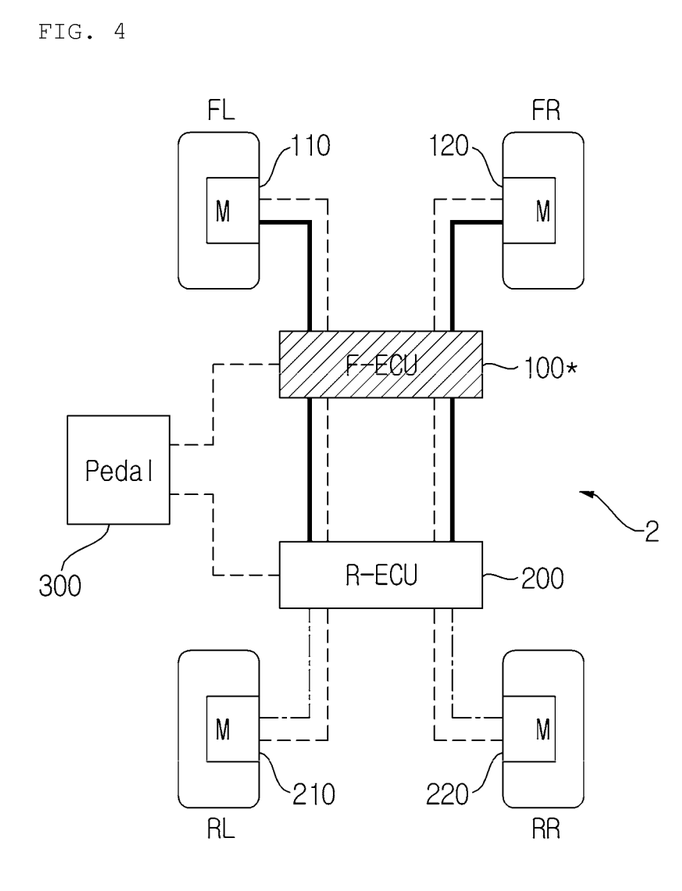
FIG. 4 is a diagram illustrating a first exemplary embodiment of a braking control system for a vehicle which is controlled in the priority order according to the present invention.

FIG. 4 is a diagram illustrating a first exemplary embodiment of a braking control system for a vehicle which is controlled in the priority order according to the present invention.

As shown in FIG. 4, the first exemplary embodiment exemplifies when a fail occurs in the F-ECU 100* and no fail occurs in the first and second electronic brakes. Basically, it is ideal to apply braking force to all of the four wheels to brake a vehicle (normal mode). However, braking should be achieved even if an unexpected fail occurs and the priority order in braking a vehicle traveling forward with two electronic brakes is as follows.

First Order) Braking with the electronic brakes of the front wheels (first and second electronic brakes).

Second Order) X-split braking (braking with the first and fourth electronic brakes 110 and 220 or the second and third electronic brake 120 and 210).

Third Order) Braking with the electronic brakes of the rear wheels (third and fourth electronic brakes).

Therefore, in FIG. 4, since a fail occurs only in the F-ECU 100*, the first and second electronic brakes 110 and 120 at the FL and the FR are controlled to operate braking by the R-ECU 200. In detail, this control is determined by predetermined priority order logic. The predetermined priority order logic is programmed in the ECUs 100 and 200 as logic that selectively supplies power to the electronic brakes that are controlled in accordance with the priority order of braking. In the first exemplary embodiment, the R-ECU 200 recognizes that a fail occurs only in the F-ECU 100* by communicating with the F-ECU 100* and the four electronic brakes 110, 120, 210, and 220 through the signal lines, such that the predetermined priority order logic switches the connection path of the power lines, for emergency braking with the first and second electronic brakes 110 and 120. That is, braking with the third and fourth electronic brakes 210 and 220 that the R-ECU 200 is in charge of is not made, while emergency braking, which corresponds to the first order, is performed by the first and second brakes 110 and 120.

Second Exemplary Embodiment

Figure 5:
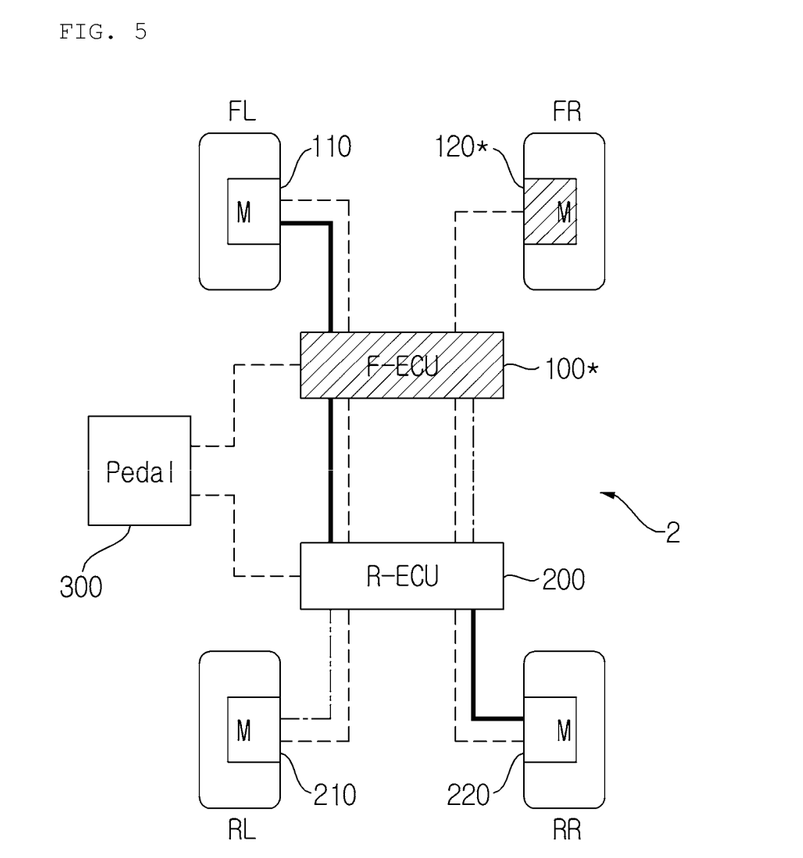
FIG. 5 is a diagram illustrating a second exemplary embodiment of a braking control system for a vehicle which is controlled in accordance with a priority according to the present invention.

FIG. 5 is a diagram illustrating a second exemplary embodiment of a braking control system for a vehicle which is controlled in the priority order according to the present invention.

As shown in FIG. 5, the second exemplary embodiment exemplifies when a fail occurs in the F-ECU 100* and the second electronic brake 120*.

In this case, according to the priority order of braking described above, it is impossible to perform braking by using only the electronic brakes of the front wheels, which corresponds to the first order.

Therefore, in the case shown in FIG. 5, the first electronic brake 110 at the FL and the fourth electronic brake 220 at the RR are controlled to operate braking by the R-ECU 200. This control follows the predetermined priority order logic programmed in the R-ECU 200.

Refer to the above description for the details of the predetermined priority order logic. In the second exemplary embodiment, the R-ECU 200 recognizes that a fail occurs in the F-ECU 100* and the second electronic brake 120* by communicating with the F-ECU 100* and the four electronic brakes 110, 120*, 210, and 220 through the signal lines, such that the predetermined priority order logic switches the connection path of the power lines, for emergency braking with the first and fourth electronic brakes 110 and 220. That is, braking with the third electronic brake 210 that the R-ECU 200 is in charge of is not made, while emergency braking, which corresponds to the second order, is performed by the first and fourth brakes 110 and 220.

Third Exemplary Embodiment

Figure 6:
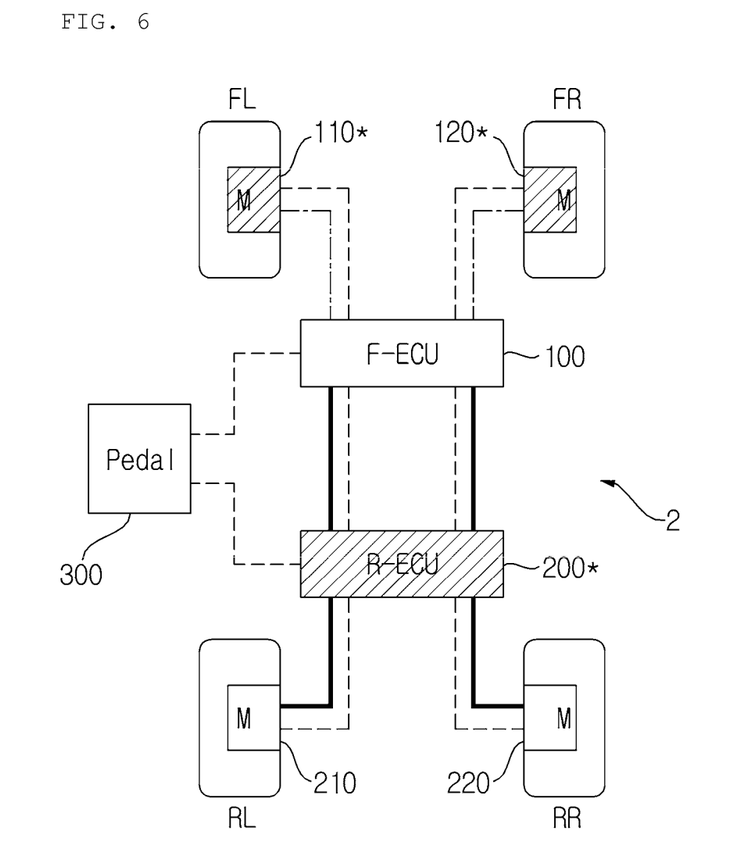
FIG. 6 is a diagram illustrating a third exemplary embodiment of a braking control system for a vehicle which is controlled in the priority order according to the present invention.

FIG. 6 is a diagram illustrating a third exemplary embodiment of a braking control system for a vehicle which is controlled in the priority order according to the present invention.

As shown in FIG. 6, the third exemplary embodiment exemplifies when a fail occurs in the R-ECU 220* and the first and second electronic brakes 110* and 120*.

In this case, according to the priority order of braking described above, it is impossible to perform braking according to both of the first and second orders.

Therefore, in the case shown in FIG. 6, the third electronic brake 210 at the RL and the fourth electronic brake 220 at the RR are controlled to operate braking by the F-ECU 100. This control follows the predetermined priority order logic programmed in the F-ECU 100.

Refer to the above description for the details of the predetermined priority order logic. In the third exemplary embodiment, the F-ECU 100 recognizes that a fail occurs in the R-ECU 200* and the first and second electronic brakes 110* and 120* by communicating with the R-ECU 200* and the four electronic brakes 110*, 120*, 210, and 220 through the signal lines, such that the predetermined priority order logic switches the connection path of the power lines, for emergency braking with the third and fourth electronic brakes 210 and 220. That is, braking with the first and second electronic brakes 110* and 120* that the F-ECU 100 is in charge of is not made, while emergency braking, which corresponds to the third order, is performed by the third and fourth brakes 210 and 220.

Fourth Exemplary Embodiment

Figure 7:
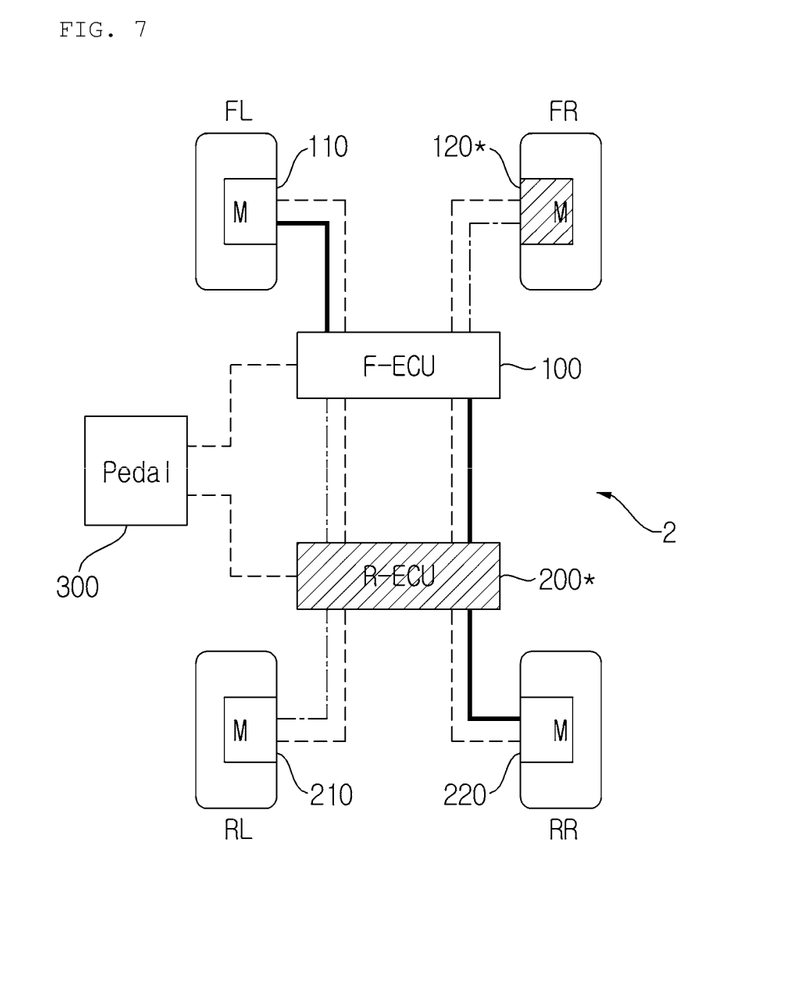
FIG. 7 is a diagram illustrating a fourth exemplary embodiment of a braking control system for a vehicle which is controlled in the priority order according to the present invention.

FIG. 7 is a diagram illustrating a fourth exemplary embodiment of a braking control system for a vehicle which is controlled in the priority order according to the present invention.

As shown in FIG. 7, the fourth exemplary embodiment exemplifies when a fail occurs in the R-ECU 200* and the second electronic brake 120*.

In this case, according to the priority order of braking described above, it is impossible to perform braking according to the first order.

Therefore, in the case shown in FIG. 7, the first electronic brake 110 at the FL and the fourth electronic brake 220 at the RR are controlled to operate braking by the F-ECU 100. This control follows the predetermined priority order logic programmed in the F-ECU 100.

Refer to the above description for the details of the predetermined priority order logic. In the fourth exemplary embodiment, the F-ECU 100 recognizes that a fail occurs in the R-ECU 200* and the second electronic brake 120* by communicating with the R-ECU 200* and the four electronic brakes 110, 120*, 210, and 220 through the signal lines, such that the predetermined priority order logic switches the connection path of the power lines, for emergency braking with the first and fourth electronic brakes 110 and 220. That is, braking with the second electronic brake 120* that the F-ECU 100 is in charge of is not made, while emergency braking, which corresponds to the second order, is performed by the first and fourth brakes 110 and 220.

Fifth Exemplary Embodiment

Figure 8:
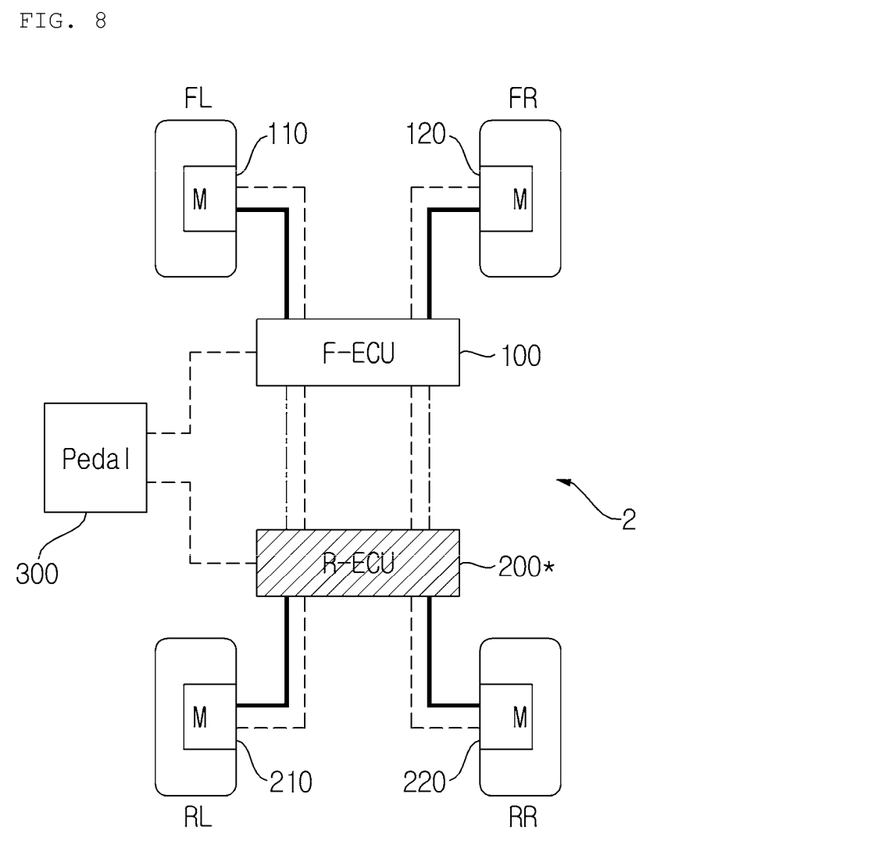
FIG. 8 is a diagram illustrating a fifth exemplary embodiment of a braking control system for a vehicle which is controlled in the priority order according to the present invention.

FIG. 8 is a diagram illustrating a fifth exemplary embodiment of a braking control system for a vehicle which is controlled in the priority order according to the present invention.

As shown in FIG. 8, the fifth exemplary embodiment exemplifies when a fail occurs only in the R-ECU 200*.

In this case, according to the priority order of braking described above, it is possible to perform braking according to the first order.

Therefore, in the case shown in FIG. 8, the first electronic brake 110 at the FL and the second electronic brake 120 at the FR are controlled to operate braking by the F-ECU 100. In the fifth exemplary embodiment, the F-ECU 100 recognizes that a fail occurs only in the R-ECU 200* by communicating with the R-ECU 200* and the four electronic brakes 110, 120, 210, and 220 through the signal lines, such that the F-ECU 100 controls the first and second electronic brakes 110 and 120 to perform emergency braking according to the first order, without switching the connection path of the power lines by the predetermined priority order logic.

Sixth Exemplary Embodiment

Figure 9:
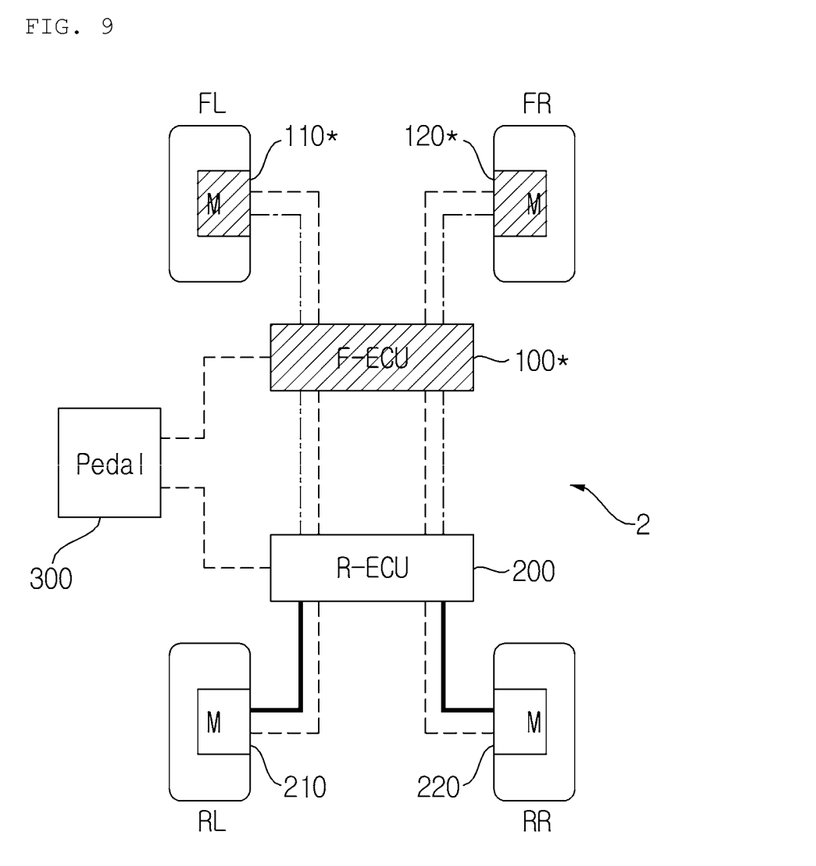
FIG. 9 is a diagram illustrating a sixth exemplary embodiment of a braking control system for a vehicle which is controlled in the priority order according to the present invention.

FIG. 9 is a diagram illustrating a sixth exemplary embodiment of a braking control system for a vehicle which is controlled in the priority order according to the present invention.

As shown in FIG. 9, the sixth exemplary embodiment exemplifies when a fail occurs in the F-ECU 100* and the first and second electronic brakes 110* and 120*.

In this case, according to the priority order of braking described above, it is impossible to perform braking by both of the first and second orders.

Therefore, in the case shown in FIG. 9, the third electronic brake 210 at the RL and the fourth electronic brake 220 at the RR are controlled to operate braking by the R-ECU 200. In the sixth exemplary embodiment, the R-ECU 200 recognizes that a fail occurs in the F-ECU 100* and the first and second electronic brakes 110* and 120* by communicating with the F-ECU 100* and the four electronic brakes 110*, 120*, 210, and 220 through the signal lines, such that the R-ECU 100 controls the third and fourth electronic brakes 210 and 220 to perform emergency braking according to the third order, without switching the connection path of the power lines by the predetermined priority order logic.

Other Exemplary Embodiments

Exemplary embodiments of the present invention which are different from the first to sixth exemplary embodiments described above are described hereafter. However, it should be noted that the details of the other exemplary embodiments are not largely different from the exemplary embodiments, and thus most of the details is not described.

The exemplary embodiments exemplified a method and a system in which the first control unit is in charge of the two electronic brakes at the front wheels and the second control unit is in charge of the two electronic brakes at the rear wheels in the normal mode, and the control units selectively control the electronic brakes in the emergency mode.

However, the exemplary embodiments to describe below are 1) an exemplary embodiment in which the first control unit is in charge of the electronic brakes at the front-left wheel (FL) and rear-left wheel (RL) and the second control unit is in charge of the electronic brakes at the front-right wheel (FR) and the rear-right wheel (RR) in the normal mode, and 2) an exemplary embodiment in which the first control unit is in charge of the electronic brakes at the front-left wheel (FL) and the rear-right wheel (RR) and the second control unit is in charge of the electronic brakes at the front-right wheel (FR) and the rear-left wheel (RL) in the normal mode, and the exemplary embodiments are implemented in the X-split type.

When a fail occurs in the first control unit, that is, in the emergency mode, the second control unit selectively controls available electronic brakes in consideration of whether a fail occurs in the first to fourth electronic brakes, in which the order of selection is controlled by the following priority order.

[Priority Order]

1. Selectively control two electronic brakes at the front wheels,

2. Selectively control any one of the electronic brakes at the rear wheels which corresponds in the X-shape to any one of the electronic brakes at the front wheels, and 3. Selectively control two electronic brakes at the rear wheels, where the control follows the first order, if it is possible, and follows the second order, if the firs order is impossible.

On the other hand, when a fail occurs in the second control unit, that is, in the emergency mode, the first control unit selectively controls available electronic brakes in consideration of whether a fail occurs in the first to fourth electronic brakes, in which the order follows the priority orders.

The detailed operational method of the braking control system in the other exemplary embodiments described above can be easily implemented and modified with reference to the first to sixth exemplary embodiments described above, and accordingly, the details are not described to avoid repetition.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. A braking control system for a vehicle equipped with an electronic brake at each wheel, the braking control system comprising:
   a first control unit controlling the operation of a first electronic brake and a second electronic brake in response to braking signals; and
   a second control unit controlling the operation of a third electronic brake and a fourth electronic brake in response to the braking signals,
   wherein when a fail occurs in any one of the first and second control units, the other control unit selectively controls at least one or more of the first to fourth electronic brakes, and
   wherein the first and second control units detect where a fail occurs in each other, and receive signals representing whether a fail occurs in the first to fourth electronic brakes.

2. The braking control system for a vehicle according to claim 1, wherein the second control unit selectively controls an available electronic brake in consideration of whether a fail occurs in the first to fourth electronic brakes, when the a fail occurs in the first control unit, and
   the selected electronic brake is any one of two electronic brakes equipped at front wheels, an electronic brake at rear wheels corresponding in an X-shape to any one of the electronic brakes at the front wheels, and two electronic brakes equipped at rear wheels.

3. The braking control system for a vehicle according to claim 1, wherein the first control unit selectively controls an available electronic brake in consideration of whether a fail occurs in the first to fourth electronic brakes, when the a fail occurs in the second control unit, and
   the selected electronic brake is any one of two electronic brakes equipped at front wheels, an electronic brake at the rear wheels corresponding the an X-shape to any one of the electronic brakes at the front wheels, and two electronic brakes equipped at rear wheels.

4. The braking control system for a vehicle according to claim 2, wherein, in selecting the electronic brakes, the two electronic brakes equipped at the front wheels are primarily selected, and the electronic brake at the rear wheels which corresponds in the X-shape to any one of the electronic brakes at the front wheel is secondarily selected.

5. The braking control system for a vehicle according to claim 3, wherein, in selecting the electronic brakes, the two electronic brakes equipped at the front wheels are primarily selected, and the electronic brake at the rear wheels which corresponds in the X-shape to any one of the electronic brakes at the front wheel is secondarily selected.

6. The braking control system for a vehicle according to claim 1, wherein the first and second control units detect where a fail occurs in each other, and receive signals representing whether a fail occurs in the first to fourth electronic brakes.

7. The braking control system for a vehicle according to claim 6, wherein power lines are connected between the first control unit and the first and second electronic brakes, between the second control unit and the third and fourth electronic brakes, and between the first control unit and the second control unit, in order that power is supplied to the first to fourth electronic brakes from the outside.

8. The braking control system for a vehicle according to claim 7, wherein the first and second control unit switch connection paths of the power lines to selectively supply the power to the first to fourth electronic brakes.

9. A braking control method of a vehicle equipped with an electronic brake at each wheel, the braking control method comprising:
   receiving braking signals by using a first control unit controlling the operation of a first electronic brake and a second electronic brake in response to braking signals and a second control unit controlling the operation of a third electronic brake and a fourth electronic brake; and
   selectively controlling at least one or more of the first to fourth electronic brakes, when a fail occurs in any one of the first and second control units, by using the other control unit;
   wherein the first and second control units detect where a fail occurs in each other, and receive signals representing whether a fail occurs in the first to fourth electronic brakes.

10. The braking control method of a vehicle according to claim 9, wherein the second control unit selectively controls an available electronic brake in consideration of whether a fail occurs in the first to fourth electronic brakes, when the a fail occurs in the first control unit, and
    the selected electronic brake is any one of two electronic brakes equipped at front wheels, an electronic brake at rear wheels corresponding in an X-shape to any one of the electronic brakes at the front wheels, and two electronic brakes equipped at rear wheels.

11. The braking control method of a vehicle according to claim 10, wherein, in selecting the electronic brakes, the two electronic brakes equipped at the front wheels are primarily selected, and the electronic brake at the rear wheels which corresponds in the X-shape to any one of the electronic brakes at the front wheel is secondarily selected.

12. The braking control method of a vehicle according to claim 9, wherein the first control unit selectively controls an available electronic brake in consideration of whether a fail occurs in the first to fourth electronic brakes, when the a fail occurs in the second control unit, and
    the selected electronic brake is any one of two electronic brakes equipped at front wheels, an electronic brake at rear wheels corresponding in an X-shape to any one of the electronic brakes at the front wheels, and two electronic brakes equipped at rear wheels.

13. The braking control method of a vehicle according to claim 12, wherein, in selecting the electronic brakes, the two electronic brakes equipped at the front wheels are primarily selected, and the electronic brake at the rear wheels which corresponds in the X-shape to any one of the electronic brakes at the front wheel is secondarily selected.

14. The braking control method of a vehicle according to claim 9, wherein the first and second control units detect where a fail occurs in each other, and receive signals representing whether a fail occurs in the first to fourth electronic brakes.

15. The braking control method of a vehicle according to claim 14, wherein power lines are connected between the first control unit and the first and second electronic brakes, between the second control unit and the third and fourth electronic brakes, and between the first control unit and the second control unit, in order that power is supplied to the first to fourth electronic brakes from the outside.

16. The braking control method of a vehicle according to claim 15, wherein the first and second control unit switch connection paths of the power lines to selectively supply the power to the first to fourth electronic brakes.

* * * * *